July 12, 1932.  W. VAN RIJSWIJK  1,867,236
GAS SEALED GLAND
Filed April 25, 1927
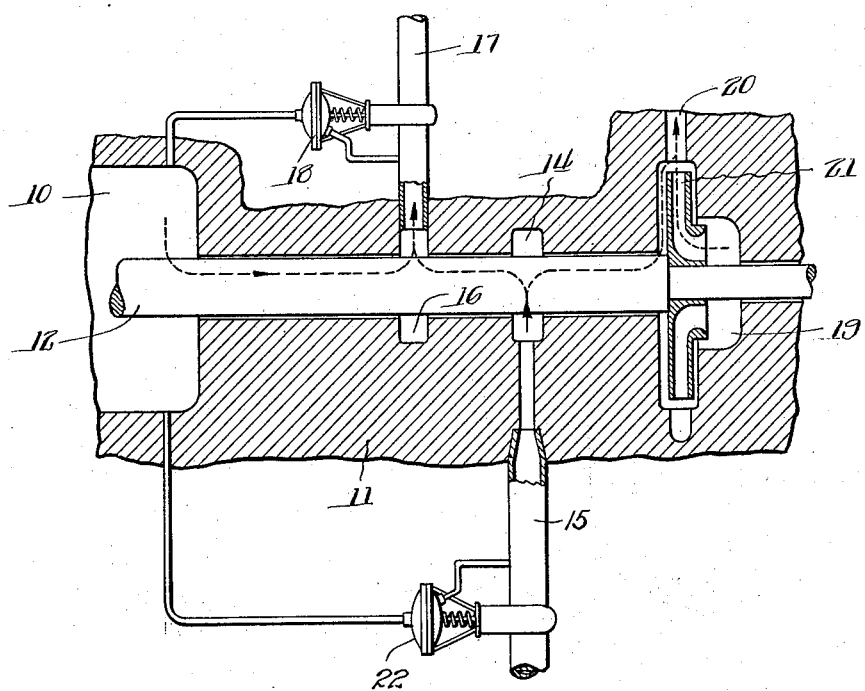
Inventor
Willem Van Rijswijk Patented July 12, 1932

1,867,236

UNITED STATES PATENT OFFICE

WILLEM van RIJSWIJK, OF BADEN, SWITZERLAND, ASSIGNOR TO BROWN BOVERI & CIE, OF BADEN, SWITZERLAND, A JOINT-STOCK COMPANY OF SWITZERLAND

GAS SEALED GLAND

Application filed April 25, 1927, Serial No. 186,553, and in Germany May 3, 1926.

This invention relates to the construction and operation of glands for effecting a seal about an operating shaft, such as a shaft serving a compressor, steam turbine, or other machine operating with a contained fluid under pressure.

The general object of the invention is the provision of gland construction and mechanism whereby an effective seal about an operating shaft may be maintained by the use of a sealing gas, such as air.

Another object is the provision of a gas sealed gland in which the pressure of the sealing gas will be maintained, at all times, equal to the pressure of the confined gas at the point where the seal is effected.

A further object is the provision of a gland construction and apparatus whereby any of the confined gas escaping from the machine casing about the shaft may be conserved.

Other and further objects will be pointed out or indicated hereinafter, or will appear to one skilled in the art upon an understanding of the invention or its employment in practice.

In the drawing forming a part of this specification, I illustrate, in diagrammatic fashion, one arrangement of structure embodying the invention, but it is to be understood that the same may be varied in arrangement and in detail without departing from the scope of the invention as defined in the appended claims.

In said drawing, the figure represents a diagrammatic illustration in the nature of a longitudinal section through a gland about a shaft which serves a machine in which a gas is maintained under a superatmospheric pressure.

The use of liquid sealed glands about operating shafts possesses certain recognized disadvantages, such as the possibility of the sealing liquid finding ingress into the machine or being volatilized by the confined gas, or absorption of power from the shaft by the sealing liquid, with production of heat in the latter. The present invention eliminates these difficulties by providing an arrangement whereby the gland is sealed by a sealing gas, the pressure of which is maintained equal to that of the confined gas, at the point where the leakage gas and the sealing gas meet, so that escape of the former is minimized and introduction of the sealing gas into the machine is avoided.

The nature of the invention will be understood in more detail by reference to the illustrative arrangement shown, in which the reference numeral 10 designates a portion of a machine casing in which a gas is maintained at a super-atmospheric pressure, which may be variable, and 11 designates a portion of a gland casing associated with the machine casing and affording a bore for the passage of the machine shaft 12. The construction of the gland, as to labyrinth features, and the like, may be of any suitable kind. Formed in the gland, and communicating with the bore thereof about the shaft 12, at a point removed from the casing 10, is an inlet chamber 14 into which a sealing gas, such as air, is injected under superatmospheric pressure through a pipe or tapping 15. Between the inlet chamber 14 and the machine casing, the gland is provided with another chamber or channel 16, communicating with the bore of the gland and serving as an equalizing and outlet chamber. This chamber has outlet connection with an outlet pipe 17 which may lead to an appropriate recovery apparatus or other point of disposal for the handled gases. Means is provided for regulating the pressure in equalizing chamber 16, the means comprising a pressure regulator 18, which is responsive to variations of the differential between the pressures existing in the machine casing 10 and in the equalizing chamber 16. This pressure regulator governs a suitable valve or other device which is operable to control and vary the pressure in equalizing chamber 16. This pressure regulator is set to maintain the pressure in equalizing chamber 16 slightly below that prevailing in the machine casing, so that there will be a flow of gas from the machine casing through the operating clearance of the shaft and into chamber 16. At the same time, the pressure in the inlet chamber 14 is maintained at such a value that a portion of the sealing gas flows from there inwardly to the equalizing chamber 16 at all times, the remaining portion of the sealing gas flowing outwardly to atmosphere, as indicated. This may be accomplished by means of another pressure regulator 22 similar in construction and manner of operation to the regulator 18, but responsive to variations in the differential between the pressures in the machine and in chamber 14. By this arrangement, the pressure of the sealing gas is equalized with that of the leaking gas, at the point where they meet, which is at equalizing chamber 16. Furthermore, by providing for flow of the sealing fluid or gas in opposite directions from the chamber or point 14 of injection, leakage of fluid from the machine casing and also ingress of air into the same is prevented. Such of the confined gas as gains access to chamber 16 is led away, together with a quantity of the sealing gas, for recovery, or discharge at a point where it will occasion no inconvenience. Ordinarily, the sealing gas will be one which can be discharged without occasioning inconvenience or harm or involving material cost, but in the event it may be desirable to conserve the sealing gas also, this may be accomplished by provision of a discharge chamber 19 between the inlet chamber 14 and the outer end of the gland, from which the sealing gas finding access thereto may be led away through a pipe 20, under propulsion by an impeller 21 operating in said chamber.

What I claim is:

1. In fluid-pressure apparatus, a fluid containing casing, an operating shaft disposed within said casing, a gland associated with said casing and loosely receiving said shaft and communicating at one end with said casing and at its other end with the atmosphere exterior of said casing, means providing for injection into said gland at a point intermediate the ends thereof of sealing fluid different from the fluid in said casing and at a pressure substantially equal to the pressure in said casing, means adjacent said gland providing for withdrawal from said gland at a point thereof intermediate said first-named point and the casing end of said gland of that portion of the sealing fluid flowing inwardly along said shaft toward the casing at a pressure below the fluid pressure in said casing by such amount as to induce flow of fluid in said casing outwardly along said shaft to such second-named point and withdrawal of such outwardly flowing casing fluid from said second-named point together with said inwardly flowing sealing fluid, and fluid-pressure means operable to maintain a constant pressure difference between the respective pressures of the casing fluid and the sealing fluid at such second-named point.

2. In fluid-pressure apparatus, a fluid containing casing, an operating shaft disposed within said casing, a gland associated with said casing and loosely receiving said shaft and communicating at one end with said casing and at its other end with the atmosphere exterior of said casing, means providing for injection into said gland at a point intermediate the ends thereof of sealing fluid different from the fluid in said casing and at a pressure substantially equal to the pressure in said casing, means providing for withdrawal from said gland at a point thereof intermediate said first-named point and the casing end of said gland of that portion of the sealing fluid flowing inwardly along said shaft toward the casing at a pressure below the fluid pressure in said casing by such amount as to induce flow of fluid in said casing outwardly along said shaft to such second-named point and withdrawal of such outwardly flowing casing fluid from said second-named point together with said inwardly flowing sealing fluid, and a pressure-regulating device responsive to conditions of pressure difference between said casing and said second-named point and operable in accordance with such conditions to maintain substantially a constant pressure difference between said casing and said second-named point.

In testimony whereof I have hereunto subscribed my name this 8th day of April, A. D. 1927, at Zurich, Switzerland.

WILLEM van RIJSWIJK.